No. 666,965. J. H. LEONHARDT. Patented Jan. 29, 1901.
VEHICLE BRAKE.
(Application filed Dec. 14, 1899.)
(No Model.)
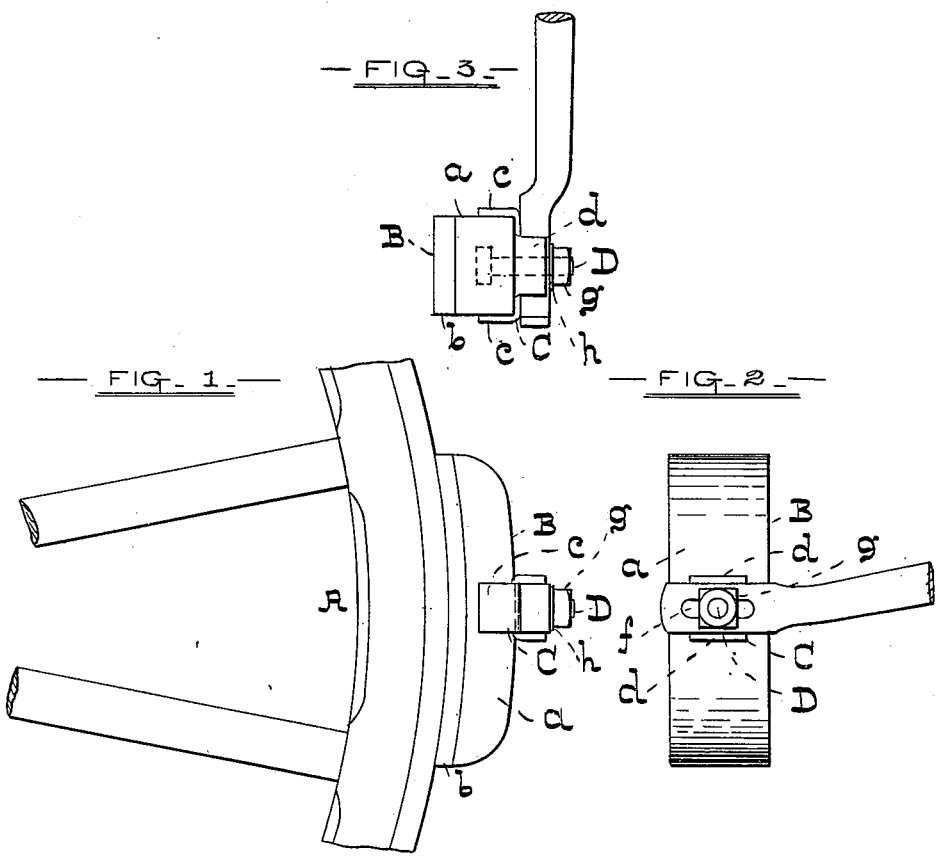

UNITED STATES PATENT OFFICE.

JOHN H. LEONHARDT, OF BALTIMORE, MARYLAND.

VEHICLE-BRAKE.

SPECIFICATION forming part of Letters Patent No. 666,965, dated January 29, 1901.

Application filed December 14, 1899. Serial No. 740,247. (No model.)

*To all whom it may concern:*

Be it known that I, JOHN H. LEONHARDT, of the city of Baltimore (Waverly) and State of Maryland, have invented certain Improvements in Wheeled-Vehicle Brakes, of which the following is a specification.

It is well known that in wheeled vehicles where the body thereof is supported by means of springs from the axles the body is liable to get a permanent set to one side, which brings the brake-shoe out of alinement with the tire of the wheel to which the shoe is applied and only a portion of the shoe is then effective as the brake is used.

The object of the present invention is to provide cheap, simple, and effective means of lateral adjustment of the brake-shoe with reference to the brake-bar, as will hereinafter fully appear.

In the further description of the said invention which follows reference is made to the accompanying drawings, forming a part hereof, and in which—

Figure 1 is a side view of a part of a wheel, the brake-shoe, and a portion of the brake-bar constructed in accordance with the present invention. Fig. 2 is an end view of the same without the wheel. Fig. 3 is a top view of Fig. 2.

Referring now to the drawings, A represents a part of the wheel to which the brake is applied, and B the brake-shoe, which is shown as constructed of a wood block $a$, with a facing $b$ of iron.

C is a clip formed of a single piece of plate-iron, having two flanges $c$, which clamp the sides of the block, and two other flanges $d$, between which the end of the brake-bar is placed.

D is a bolt the head of which is sunk in the wood block of the brake-shoe. The said bolt passes through the clip, which has a hole therein of practically the same size as the bolt, and also through a slot $f$ in the end of the brake-bar. The nut $g$ is screwed against a washer $h$ on the face of the brake-bar. When the vehicle is built, the shoe is made to register with the tire of the wheel and the bolt D is in the center of the slot $f$, and should the body of the vehicle get a lateral set the nut $g$ is slackened and the shoe moved laterally of the bar until it again registers with the tire of the wheel. With the construction described the brake-bar has never to be lengthened or shortened or changed in any manner, the adjustment being effected by shifting the shoe in the manner specified.

I claim as my invention—

In combination with a brake-shoe having a fixed standing bolt the head of which is embedded in the said shoe, and a slotted brake-bar through which the said standing bolt passes, a clip interposed between the said brake-shoe and the brake-bar which consists of a plate having flanges which clamp the sides of the brake-shoe, and other flanges which clamp the upper and lower sides of the brake-bar, and a nut screwed upon the said standing bolt whereby the three members of the brake mechanism are drawn together, substantially as specified.

JOHN H. LEONHARDT.

Witnesses:
   WM. T. HOWARD,
   GEO. F. FAUST.